United States Patent
Cannady et al.

(10) Patent No.: US 11,553,087 B1
(45) Date of Patent: Jan. 10, 2023

(54) COMMUNICATION SESSION USING A VIRTUAL ENVIRONMENT

(71) Applicant: Amazon Technologies, Inc., Seattle, WA (US)

(72) Inventors: William Arnold Cannady, Peekskill, NY (US); Jeremy M. Puent, Wheeling, IL (US); Kristopher Joseph Schultz, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/037,213

(22) Filed: Sep. 29, 2020

(51) Int. Cl.
*H04M 3/51* (2006.01)
*H04M 3/493* (2006.01)

(52) U.S. Cl.
CPC ......... *H04M 3/5191* (2013.01); *H04M 3/493* (2013.01); *H04M 3/5133* (2013.01)

(58) Field of Classification Search
CPC ... H04M 3/493; H04M 3/5133; H04M 3/5191
USPC .............. 370/351–357, 259–271; 379/90.01, 379/201.01, 265.01–266.1, 88.01–88.28; 709/201–207, 217–248
See application file for complete search history.

(56) References Cited

U.S. PATENT DOCUMENTS

| | | | |
|---|---|---|---|
| 8,737,598 B2 * | 5/2014 | Bruce | H04M 7/0024 379/265.09 |
| 9,105,013 B2 * | 8/2015 | Chavez | G06Q 10/101 |
| 9,349,118 B2 * | 5/2016 | Chavez | G06Q 10/103 |
| 10,970,547 B2 * | 4/2021 | Faulkner | G06T 7/50 |
| 2004/0103038 A1 * | 5/2004 | Power | G06Q 30/0613 705/26.41 |

OTHER PUBLICATIONS

"Call Center Demo Trailer"; https://www.youtube.com/watch?v=ljVy0c46pt8&feature=youtu.be; Nov. 2019; accessed Oct. 26, 2020; 3 pages.

* cited by examiner

*Primary Examiner* — Hemant S Patel
(74) *Attorney, Agent, or Firm* — BakerHostetler

(57) ABSTRACT

Implementations for providing communication services using a virtual environment are described. An audio communication session may be established between a first user device and a second user device. The second user device may answer the audio communication session using a virtual environment. The virtual environment may be updated to display virtual features associated with the communication session.

18 Claims, 9 Drawing Sheets

COMMUNICATION SESSION USING A VIRTUAL ENVIRONMENT

BACKGROUND

A conventional contact center allows for audio calls between users and employees of the contact center. If the contact center receives calls related to complex services or products, such as machinery, the employee may have difficulty accessing detailed information to help customers. Available visualization mechanism are separate from the employee's phone and may be inaccessible or cumbersome while handling calls. Thus, there is a need for more sophisticated and flexible approaches for visually rendering information associated with callers during communication sessions.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

The disclosed aspects relate to a communication service for providing communication with a user operating a virtual environment. The virtual environment may be rendered by a virtual reality application using a three-dimensional rendering engine. The virtual environment may be a three-dimensional space in which a user is allowed to explore a room or other scene. A first user calling on a phone using a common telephone network (e.g., public switched telephone network, cellular network) may be connected to a second user associated with a virtual environment. An audio communication link may be established between the first user and the second user to enable communication in real time via audio. While the first user experiences the audio communication link by talking via a phone, the second user experiences the audio communication link as an audio stream accessed within (e.g., or otherwise associated with) the virtual environment. User information associated with the first user and/or second user may be used to determine virtual features of the virtual environment. Other communication technologies may also be used to connect the first user and second user. The first user may connect using video, audio, text, or a combination thereof. The first user may use an application, such a chat application, a video calling application, a web application, a content browsing application, and/or any other available mechanism for connecting to the second user.

Virtual features may comprise models (e.g., associated logic and/or information) that can be instantiated (e.g., rendered) in a virtual three-dimensional environment. A virtual feature may comprise an object (e.g., a model of a real world product), a panel comprising information (e.g., user information, account history), a process flow (e.g., a series, sequence, or pattern of process dialogue boxes), and/or the like. Virtual features determined to be relevant to the first user may be output in the virtual environment associated with the second user. For example, if the first user is calling for assistance with an engine, a three-dimensional model of the engine may be selected as a virtual feature and rendered in the virtual environment of the second user. The second user may interact with, view, modify, and/or the like the virtual features in a similar manner (e.g., walking around, looking up close, removing parts) as a user viewing the engine in the real world. This interaction allows the second user to more easily assist the first user regarding the actual real-world product or other process. The virtual features may be associated with application logic that allows the second user to trigger application features, such as processing an order, making a payment, and/or the like.

Figure 1:
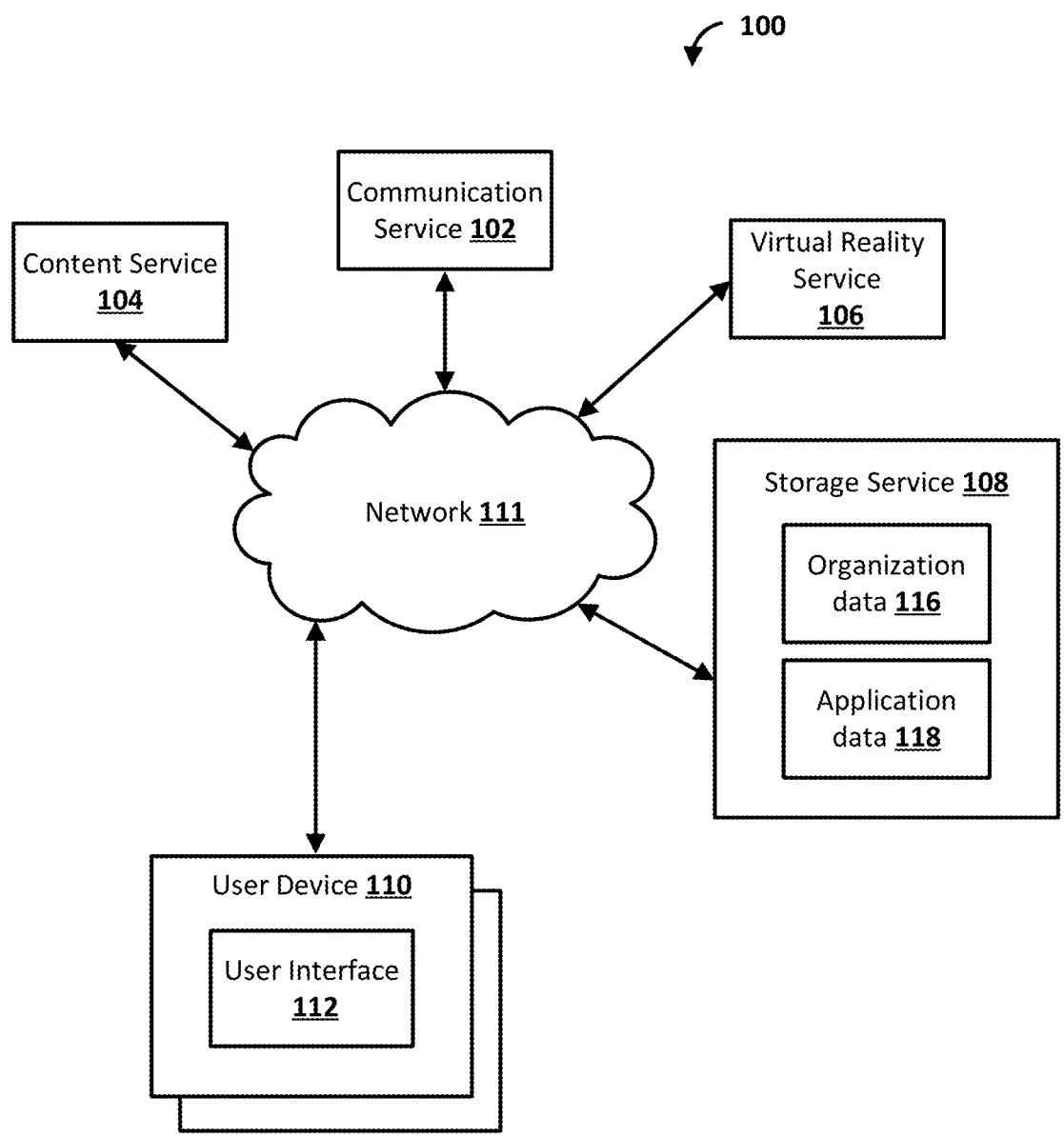
FIG. 1 is a diagram illustrating an example computing system for implementing a communication service.

FIG. 1 is a diagram illustrating an example computing system 100 for providing one or more services. The one or more services may comprise a communication service 102, a content service 104, a virtual reality service 106, a storage service 108, or a combination thereof. The communication service 102, the content service 104, the virtual reality service 106, the storage service 108, or a combination thereof may be part of a services platform, such as a web services platform. The services platform may provide network based services that are geographically dispersed (e.g., external to user premises). The services platform may provide the one or more services to one or more user devices 110.

The system 100 comprises a network 111. The network 111 is configured to communicatively couple one or more of the services platform, the communication service 102, the content service 104, the virtual reality service 106, the storage service 108, the user device 110, and/or the like. The network 111 may also comprise a plurality of network devices, such as routers, switches, access points, switches, hubs, repeaters, modems, gateways, and/or the like. The network 111 may comprise wireless links, wired links, a combination thereof, and/or the like.

The one or more user devices 110 comprise a computing device, such as a mobile device, a smart device (e.g., smart watch, smart glasses, smart phone), a computing station, a laptop, a workstation, a tablet device, a virtual reality device (e.g., virtual reality headset, three-dimensional projection device), and/or the like. A virtual reality device may comprise a device that outputs a virtual environment, such as an immersive virtual environment. A virtual environment is a virtual reality environment that emulates real world features in a digital space that is rendered as projected images to a user. The virtual environment may comprise navigable three-dimensional space in which a user is virtually placed for interaction with the virtual environment. The virtual environment comprise graphically displayed virtual features, such as representations of three-dimensional building structures (e.g., rooms, walls, ceilings, floors), outdoor landscapes (e.g., trees, a sky, ground, plants, light), objects (e.g. real-world objects, imagined objects), and/or the like.

A virtual reality device may comprise a head-mounted device with a stereoscopic display to immerse the wearer in a virtual environment displayed on the stereoscopic display. The virtual reality device may allow the user to pan around the virtual environment based on input from the user (e.g., by sensors that detect movement of the user's head and/or eyes, a hand-held controller, etc.). Controllers may be used with the virtual reality device to manipulate (e.g., select, move, open) virtual objects in the virtual environment. A virtual reality device may comprise a heads-up display, a contact lens, a virtual retinal display, a spatial augmented reality device (e.g., digital projectors), and/or the like. Alternatively, or additionally, a virtual reality device may comprise an augmented reality device (e.g., smart glasses, smart lens) which displays virtual features in a virtual environment that overlays a real environment. For example, a user may see both a virtual object in the virtual environment and the real world around the user. The virtual objects may appear to the user as if the virtual object is an object in the real world. It should be understood that the term virtual environment as used herein includes both fully immersive virtual environments and augmented reality virtual environments. In some scenarios, the virtual environment may comprise an image projected in real space, such as a hologram. In some scenarios, the virtual environment may be output as a three-dimensional representation of a room or other real-world space that can be viewed and navigated (e.g., traversed in three dimensions) on a traditional computer screen.

In embodiments, the one or more user devices 110 are configured to output one or more user interfaces 112, such as a user interface associated with the content service 104, a user interface associated with the communication service 102, a user interface associated with the virtual reality service 106, or a user interface associated with the storage service 108, and/or the like. The one or more user interfaces are output by an application, such as desktop application, a mobile application, a browser application, a content browser, a web browser, a virtual reality application, a virtual reality browser, and/or the like.

The communication service 102 is configured to provide communication session services for the user devices 110, such as connection of communication links (e.g., or sessions, links for a session) between the user devices 110. In embodiments, the communication service 102 are configured to provide services for one or more contact centers, such as a virtual (e.g., or network based) contact center service. The communication service 102 may support a variety of user roles, such as managers and associates. The communication service 102 may be configured to allow managers to establish call flow procedures, configure automated message systems, manage associates, perform analytics on calls associated with a call center, and/or the like. The communication service 102 may be configured to allow associates to establish communication links (e.g., audio calls, video calls, text communication sessions, chats, multimedia communication sessions) associated with a specific contact center.

The communication service 102 is configured to receive a communication link request (e.g., connection request, audio call request, video call request, chat request, multimedia session request) associated with a user device 110, such as a first user device. In some scenarios, a communication link may be established without a request. For example, an initial message comprising communication from a user may be considered as establishing a communication link. The communication link request may comprise a message, such as a session initiation protocol request (e.g., SIP invite request). In an embodiment, the communication link request is received via a telephone network. In such an embodiment, the first user device may dial a telephone number associated with a call center of the communication service 102. The communication service 102 may receive the communication link request based on the first user device dialing the telephone number. The communication service 102 is configured to establish, based on the communication link request, a first communication link between the communication service 102 and the first user device. The communication service 102 may send a response to the communication link request to establish the first communication link.

In embodiments, the first user device may send a communication link request via an application (e.g., mobile application, computer application), a content page (e.g., executable code and/or scripting language on the content page may cause sending of the request), web page, and/or any other mechanism for initiating communication over a network. The communication service 102 may have a plurality of connection services that allow users to connect via different types of communication technologies, such as telephone communication, web based communication, video communication, messaging communication, chat communication (e.g., private chat, group chat, channel based chat), a combination thereof, and/or the like.

The communication service 102 is configured to determine user information associated with a user of user device and/or a communication link, such as the first communication link. In embodiments, the user information comprises context information received from a user device 110, such as the first user device. The context information may comprise user input received from user device 110 during the communication link. The communication service 102 may answer (e.g., or establish) the communication link using an automated voice menu. The automated voice menu provides questions (e.g., or prompts) in audio form. Answers to the questions may be provided by a user via a user device 110, such as by pressing a number (e.g., causing a tone to be output), or speaking the answers to the questions. The answers may be translated from an audio signal (e.g., or other data signal) to data indicating an interaction with an automated voice menu of the audio communication link. The context information may be stored as user information associated with the communication link. The questions and/or answers may also be provided via a chat dialog, texting session, and/or the like. If the communication link is a video communication link, the context information may be determined by analyzing an image captured of the communication link.

In embodiments, the communication service 102 is configured to determine account information based on a communication link. The user information may comprise account information associated with user of a user device 110, such as the first user device. The account information may comprise one or more of a user name, an order history, call history, product information of a product in the order history, business information, or any other similar information. The communication service 102 can query the storage service 108 to determine the account information. The storage service 108 may comprise organization data 116. The organization data 116 may comprise data for an organization that manages a particular contact center being supported by the communication service 102. The organization data 116 may comprise historical data associated with the organization. The historical data may include data from prior communication links established by the user, data associated with prior transactions (e.g., such as purchases) of the user, or any other prior user data about the user associated with a user device 110. The organization data 116 may be searched to determine the account information.

In embodiments, the virtual reality service 106 receives the user information and/or an indication of a communication link from the communication service 102. The virtual reality service 106 (e.g., or the communication service 102, or a user device 110) is configured to determine one or more virtual features associated with a communication link. The virtual reality service 106 may be configured to determine, based on the user information, the one or more virtual features. In embodiments, the virtual reality service 106 is configured to allow users to provide rules, and/or associations between virtual features and corresponding user information. The virtual reality service 106 allows keywords, patterns (e.g., combinations of words in the user input, combinations of different types of user information), and/or the like to be associated with corresponding virtual features.

The one or more virtual features may comprise graphical features visually representable in a virtual environment. A virtual feature may be a two-dimensional feature, three-dimensional feature, and/or the like. A virtual feature may be a virtual representation of a real-world object for the virtual environment. In embodiments, the virtual feature is based on object modeling information, animation information (e.g., showing movement of three-dimensional shapes), and/or the like. A virtual feature may be a virtual representation an application (e.g., application window, button, interface element) for the virtual environment. A virtual feature may be an interactive feature, such as a feature that allows selection, movement, animation, manipulation (e.g., from a regular view to an exploded view, change of size, deformation).

In embodiments, a virtual feature may comprise a plurality of parts. A part may be selectable in the virtual environment. A part may be associated with corresponding information. Selection of the part may cause the information to be displayed in the virtual environment. If the virtual feature is a representation (e.g., model) of a mechanical device, such as an engine, selection of a part of the representation of the mechanical device may cause information about the part to be displayed. The information associated with the part may comprise a part number, a manual, a summary, know how related to the part, an interface element for initiating an order request, images of the part, videos about the part, and/or the like.

The one or more virtual features may comprise a graphical representation of the user information. The graphical representation of the user information may comprise a window, panel, and/or the like comprising text, images, videos, links, and/or the like representing the user information. In embodiments, the one or more virtual features comprise an object model determined to be relevant to a user of the first device. The object model may comprise a representation of a machine, product, device, and/or the like. The object model may be manipulated in the virtual environment to obtain different views (e.g., normal view, exploded view, view separating parts) of the object.

The one or more virtual features may comprise a graphical representation of a process flow (e.g. call flow) for a user of the second device. The process flow may be a process flow associated with a contact center. A manager of a particular content center may interact with the contact center service 204 to input one or more process flows. A process flow may be used for handling routine situations associated with customers. A process flow may be associated with ordering a product, requesting assistance, establishing a service, requesting maintenance, entering into an agreement, making a payment, and/or the like. A process flow may be represented as window or other object that allows a user to interact with (e.g., add information, click button) the process flow in the virtual environment.

In embodiments, the virtual reality service 106 is configured to determine data indicative of the one or more virtual features. The data indicative of the one or more virtual features may comprise application data 118 associated with an application, such as a web browser, a virtual reality application, and/or the like. The application data 118 may comprise computer readable instructions associated with facilitating the communication link and/or virtual reality environment. The application data 118 may be stored as a document, one or more files, fields, and/or any other suitable format. The application data 118 may comprise (e.g., or indicate) an audio component, such as a scripting component (e.g., javascript component, module), configured to facilitate a communication link. In an embodiment, the audio component comprises a webRTC component. The application data 118 may comprise (e.g., or indicate) a rendering component, such as a scripting component (e.g., javascript component, module), configured to cause output of a virtual environment. In an embodiment, the rendering component comprises a webGL component. The rendering component may cause an application to render three-dimensional content. The rendering component may comprise an application programming interface, a code module, and/or the like that causes graphical representations to be output to a user. The rendering component may draw three-dimensional objects, which include geometric shaping, shading, coloring, texturing, lighting features, and/or the like. Drawing may be performed based on object models, computer-readable code (e.g., execution of commands), and/or the like. The object models may comprise building structures (e.g., rooms, walls, ceiling, windows, floor), objects (e.g., representing any real or imaginary object), land landscaping, and/or the like. In some scenarios, virtual features associated with a communication link may comprise imaginary objects, such as floating graphical objects representing a process flow, application logic, and/or the like.

The audio component may be integrated with (e.g., or in communication with) the rendering component to cause rendering of features indicative of a communication link in a virtual environment. The audio component may receive data indicative of a communication link. The rendering component causes output of an indication (e.g., an alert) of an incoming communication link (e.g., received from the communication service 102). The rendering component may be configured to respond to events from the audio component. Communication events of the audio component may be used to trigger rendering events of the rendering component. In embodiments, options for responding to the communication link are output in the virtual environment. A phone icon may be visually pulsed or otherwise animated to visually represent to a user of the virtual environment of the incoming communication link. In some scenarios, the user in the virtual environment may perform control actions, such as accepting the communication link (e.g., by pressing a button on a controller). Control actions associated with the communication link may be used to trigger events (e.g., an event indicating a call is answered) on an event bus associated with the audio component. A control action may be used to trigger generation of the one or more virtual features in the virtual environment.

The application data 118 may be accessed by a user device 110, such as a user device for answering calls associated with a contact center. In some scenarios, the user device 110 may be configured to determine one or more virtual features based on the application data, user information, and/or the like. The content service 104 may be configured to provide a network-based content service. The content service 104 may be implemented by one or more of the computing nodes of the service platform. The content service 104 is configured to provide access (e.g., via the network 111) to content. The content may comprise text, audio, video, computer-readable code, contact center content, application content, a combination thereof, and/or the like. The content may comprise one or more files for an application, such as a web-application, a network-based application, and/or the like. In embodiments, the content service 104 is configured to host the application to allow users to access the application via the network 111.

The content is used by a user device 110 to output a virtual environment. A user device 110 may access application data associated with a virtual reality application, content browser, a content browser configured to render three-dimensional content, and/or the like. A user may login to a user interface, such as the contact center user interface. The user may be sent application data configured to cause output of a virtual environment associated with answering calls of the contact center. The user device 110 may be authorized via an authorization process before receiving the application data. The user interface may configure the user device 110 to manipulate the virtual features, such as via navigation in the virtual environment. The user interface may configure the user device to predict additional features. The user interface may be configured to process events associated with the user interface, such as audio events (e.g., detection of a keyword, call events), navigation events (e.g., user movements/gestures associated with the virtual environment), rendering events, and/or the like. In some scenarios, any feature or any combination of the features of the communication service 102, communication service 106, storage service 108 may be performed by the user device 110. For example, the user device 110 may directly receive a communication request from another user device, determine user information, determine virtual features, and/or cause output of a virtual environment comprising the virtual features.

In embodiments, updated application data is sent to the user device 110 to indicate an incoming communication link. The communication link may be the original communication link initiated between a first user device and the communication service 102. The communication link may be an additional link of a communication session. The communication session may comprise a plurality of communication links, such as a link from a first user device to the communication service 102 and another link from the communication service 102 to a second user device. The communication link may be forwarded, transferred, bridged, and/or the like to create a communication link (e.g., or session) between the first user device and a second user device. The communication link may be a communication session accessed via a virtual environment by the second user device (e.g. and accessed by an audio phone call by the first user device). If the communication link is established between the two user devices, application data associated with the communication link may be sent (e.g., by the virtual reality service) to the second user device. The application data may cause the one or more virtual features to be rendered in the virtual environment.

Figure 2:
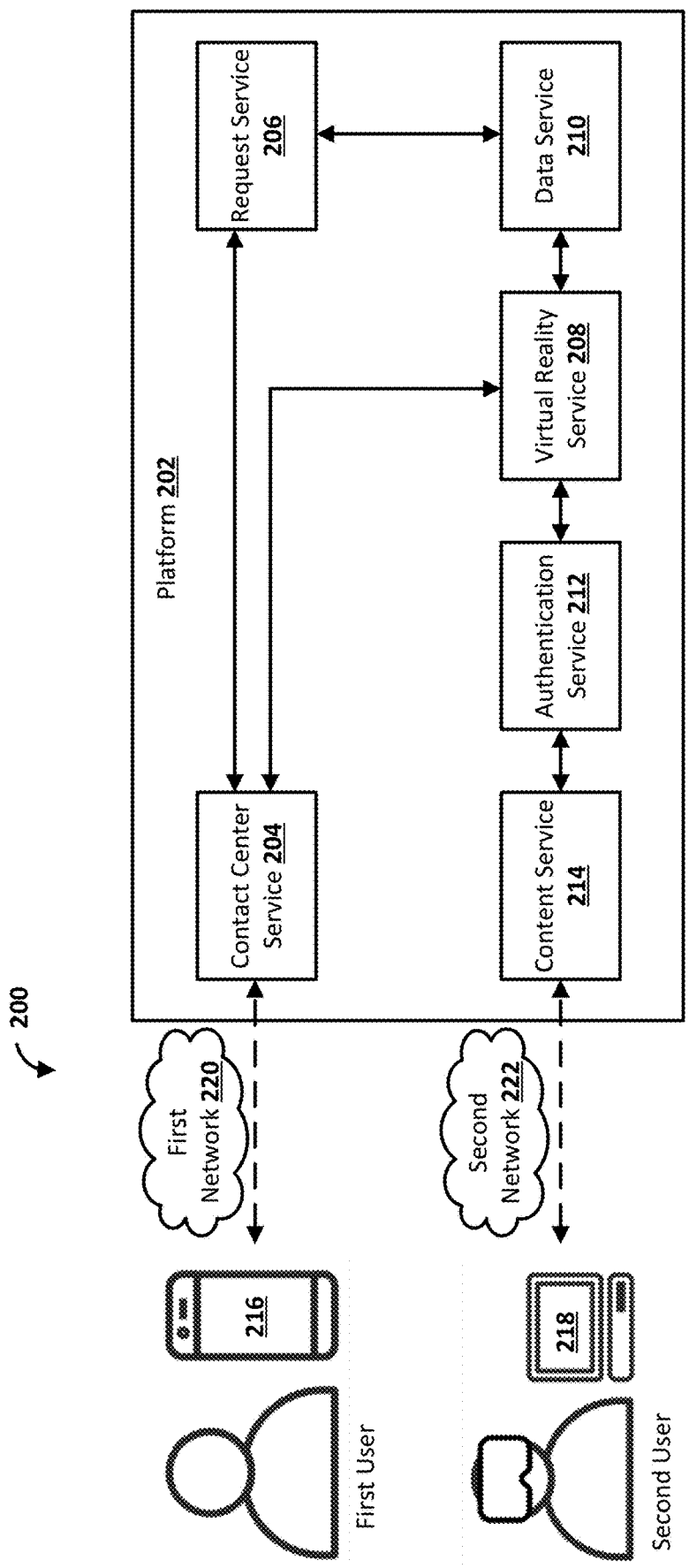
FIG. 2 is a block diagram showing another system for implementing a communication service.

FIG. 2 is a block diagram showing another example system for implementing a communication service, such as service for establishing audio communication with a virtual environment.

The system 200 comprises a platform 202, such as a computing platform, services platform, and/or the like. The platform 202 comprises one or more services, such as a contact center service 204, a request service 206, a virtual reality service 208, a data service 210, an authentication service 212, a content service 214, and/or the like. The platform 202 is configured to communicate with one or more devices, such as a first device 216 and a second device 218, and/or the like. The first device 216 is a device of a first user. The second device 218 is a device of a second user. The first device 216 is configured to communicate with the platform 202 via a first network 220. The second device 218 is configured to communicate with the platform via a second network 222. The first network 220 may comprise a telephony network (e.g., or telephone network), such as a public switched telephone network. The second network 222 may comprise a wide area network, such as the Internet.

The contact center service 204 comprises a service for management of a contact center, such as a cloud-based contact center, a virtual contact center, and/or the like. The contact center service 204 may be associated with a user interface for management contact centers for a plurality of different contact centers (e.g., or content center customers). In embodiments, the contact center service 204 is configured to provide routing, queuing, analytics, management, and/or the like associated with a contact center. The contact center service 204 may be configured to receive communications associated with corresponding contact centers, such as audio calls, emails, chat, and/or the like.

The contact center service 204 may receive a call request from the first device 216 via the first network 220. The contact center service 204 may establish a first communication link (e.g., or communication session) with the first device 216. The first communication session comprises an audio communication link. In embodiments, the contact center service 204 is configured to determine user information associated one with one or more of the first user, the first device 216, the first communication link, a combination thereof, and/or the like. The user information may comprise context information associated with the first communication link. The context information may be indicative of a reason for the communication, information that is requested, a service that is requested, and/or the like. The user information may comprise account information. The account information may comprise historical information associated with an account associated with the first user, associated with the first device 216, and/or the like.

The contact center service 204 may be configured to request context information from the first device. The contact center service 204 may provide for the first communication link an automated voice service, such as an automated voice menu, automated attendant, phone menu, virtual receptionist, and/or the like. The automated voice service may output one or more audio questions. The one or more audio questions may request various context information, such as a name of the user, an account number, an order number, a product name, a product number, a category, reason for the call (e.g., service request, product request, assistance request), department (e.g., service, parts, new ordering, general, payment), and/or the like. The first user may navigate and/or provide user input by pressing a digit on the first device, speaking the user input, and/or the like. The user input may be processed (e.g., natural language processed, searched) to determine the context information.

The contact center service 204 may be configured to request the account information via the request service 206. The request service 206 may comprise a function, application programming interface, and/or other service used for processing requests. The request service 206 have be accessed via a uniform resource identifier (e.g., link, web location, function identifier). The request service 206 may be configured to search the data service 210 for information relevant to the user account.

In embodiments, the contact center service 204 is configured to communicate with the virtual reality service 208. The contact center service 204 and/or the virtual reality service 208 are configured to facilitate a communication session (e.g., using one or more communication links) between the first device 216 and the second device 218. The contact center service 204 may send the user information associated with the first device 216 to the virtual reality service 208. The virtual reality service 208 may be configured to determine, based on the user information, one or more virtual features. The one or more virtual features may comprise graphical features visually representable in a virtual environment. The one or more virtual features may comprise audio features (e.g., sound files), video features (e.g., video files), text features, and/or the like that may be output in a virtual environment.

In embodiments, the one or more virtual features are determined based on one or more matching rules. The matching rules may associate virtual features with corresponding user information, types of user information, categories of user information, and/or the like. The corresponding user information may comprise a keyword, such as an identifier, name (e.g., name of service, process flow, name of a product), account number, and/or the like. A matching rule may indicate that a virtual feature is determined (e.g., predicted, inferred) to be relevant to a user (e.g., the first user) if a keyword associated with the virtual feature matches the user information. Matching may comprise having a threshold amount of similarity. Matching may comprise the keyword being identified in the user information. An example matching rule comprises a pattern recognition rule. The pattern recognition rule may identify a pattern in the user information, such as occurrence of a group of words. A matching rule may associate an option in the automated voice service with a corresponding virtual feature and/or category of virtual features. If a category of virtual features is identified, matching rules may be used to further identify relevant virtual feature based on the user information.

In embodiments, the one or more virtual features are determined based on an answer to a question. The question may be provided to the user via an automated voice system. The answer may be associated with one or more additional questions (e.g., to gather follow up information). For example, a graph or other logical associations can be used to associate additional questions with corresponding answers. For example, if a user's answer indicates the call is about a product, the user may be asked to input a product number, order number, and/or the like. The answer may be used to trigger determining account information, such as prior order history. Information about the most recent order may be output as part of an additional question to confirm the reason for the call.

In embodiments, the one or more virtual features are based on metadata stored in the account information. The metadata may indicate past order history, past number of time the user has called, other keywords, and/or the like. A pattern may be used to determine the one or more virtual features. The pattern may comprise a grouping of metadata, presence and/or absence of metadata, and/or the like.

In embodiments, the one or more virtual features are determined based on communication within the virtual environment. For example, the matching, pattern recognition, and/or other analysis may be performed based on audio (e.g., or other feedback) provided to the virtual environment. If the first user mentions a product while on a call with the second user, then mention of the product may be detected. An option may be provided to the second user to view an object model, instructions, know how, pricing, order information, and/or other information associated with the product. The option may comprise a recommended next action. Corresponding virtual features may be determined and received by the second user device to cause output of the virtual features.

The virtual reality service 208 is configured to determine and/or generate data indicative of the one or more virtual features. In an embodiment, the virtual reality service 208 queries the data service 210 to determine the data indicative of the one or more virtual features. The data indicative of the one or more virtual features is sent to the second device 218. The data indicative of the one or more virtual features may be sent to a content service 214. The content service 214 may comprise a service for distributing content to a variety of locations.

In embodiments, the second device 218 is configured to receive the data indicative of the one or more virtual features from the content service 214. The second device 218 may be navigated by the second user to an application, such as a web browser. The second user may interact with the application (e.g., navigate to a web page) to login to a user interface, such as a contact center user interface. The interaction of the second user may cause a request for application data to be sent to the content service 214. The content service 214 may query the authentication service 212 to verify that the second user is authorized to access the contact center user interface. If authorized, the content service 214 may send the application data. In embodiments, the application data configures the second device 218 to output (e.g., or render) a virtual environment. The second device 218 may periodically query the content service 214 for updates to the application data. An update may comprise an indication of an incoming communication link. An update may comprise an update comprising the data indicative of the one or more virtual features. The second device 218 may visually represent the communication link (e.g., or communication session), and/or any of the one or more virtual features to facilitate assisting the first user. The second user may manipulate, navigate, interact with, and/or the like representations of the virtual features in the virtual environment to assist the first user.

FIGS. 3A-G are representations of example virtual environments. The example virtual environments show example virtual features that may be determined, generated, and/or added to the virtual environment based on user information.

Figure 3A:
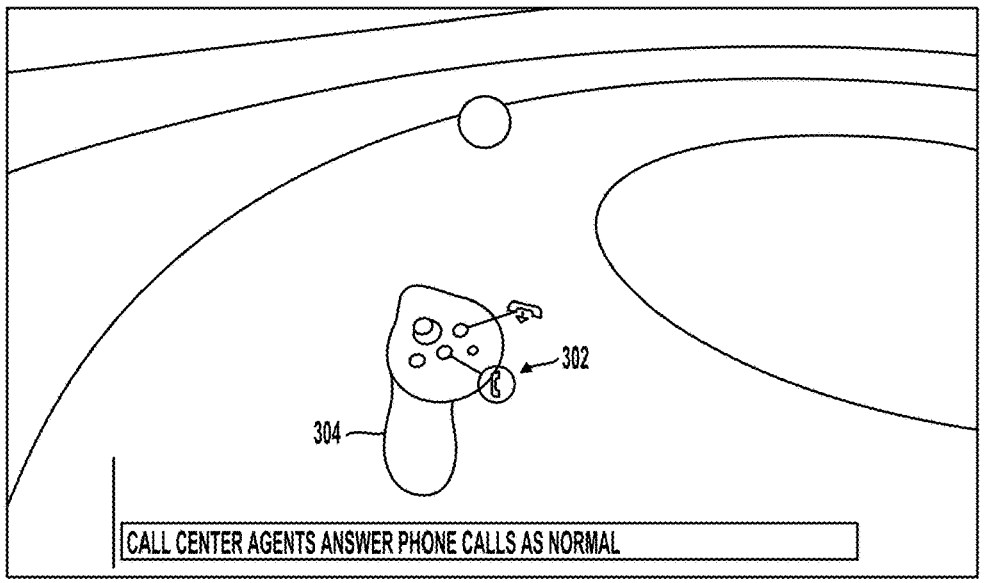
FIG. 3A is a representation of an example virtual environment showing a control element for answering audio calls.
Figure 3B:
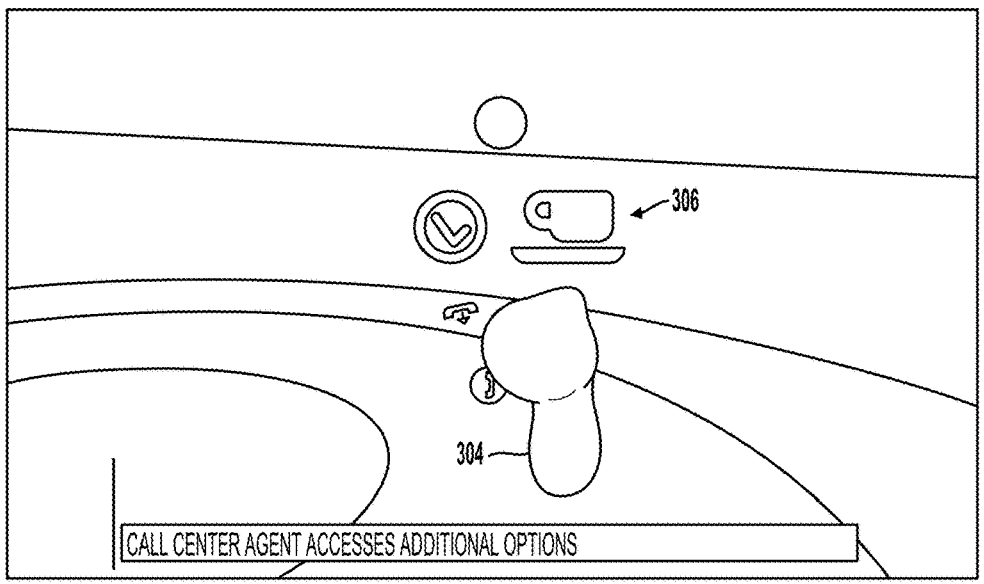
FIG. 3B is a representation of an example virtual environment showing a control element for additional control element options.

FIG. 3A shows an example virtual environment comprising a control element. The virtual environment is a representation of a three-dimensional physical environment. The control element 302 may comprise a visual representation of a physical controller 304, a hand of the user, and/or the like. A computing device may detect position information (e.g., position, orientation, size, shape, and/or the like) of the controller (e.g., or hand) and cause output of the visual representation based on the detected position. The virtual representation is output by the computing device. The computing device may comprised in or in communication with a virtual reality headset, which may output the virtual environment. The control element 302 may show which buttons on the physical controller to press to accept or reject an incoming audio communication link. The control element 302 may show gestures (e.g., for the user's hand) to trigger control options, such as accepting a communication request, rejecting a communication request, navigating a menu, manipulating a virtual feature, and/or the like. Different control elements may be shown based on movement, such as movement of the controller, movement of the hand, and/or the like. As shown in FIG. 3B, if a user twists (e.g., rotates) the controller 304 and/or hand (e.g., or arm), then different control elements 306 may be shown (e.g., control options associated with a status of the user) than the control options from the initial position (e.g., resting position). Additional options may comprise status options, break options, and/or the like. The incoming audio communication link is initiated by a contact center service, such as contact center service 204 of FIG. 2.

Figure 3C:
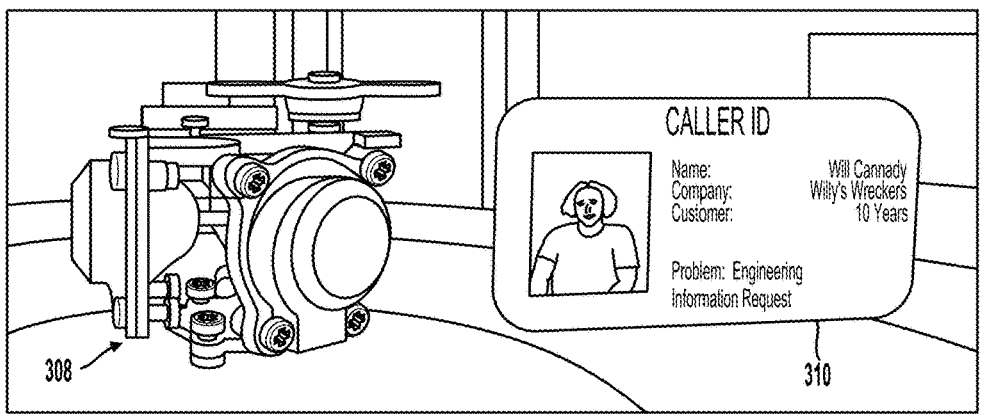
FIG. 3C is a representation of an example virtual environment showing virtual features including an object and account information.

As shown in FIG. 3C, if the user accepts the call, virtual features are output (e.g., generated, added to) in the virtual environment. The virtual features are based on user information associated with the caller. The virtual features comprise a virtual representation of a three-dimensional object 308, such as the mechanical object shown. The user information indicates that the caller is interested in information about the object 308. The example virtual features comprise an information element 310 (e.g., window, pane, dialogue). The information element 310 displays user information, such as name, company, customer history, details about the reason for the call, a picture, a combination thereof, and/or the like. It should be understood the user is not limited to the view shown. The user may navigate closer, further away from, above, below, around, and/or otherwise navigate in the three-dimensional space of the virtual environment to observe the object 308 and/or information element 310 from a variety of positions and angles.

Figure 3D:
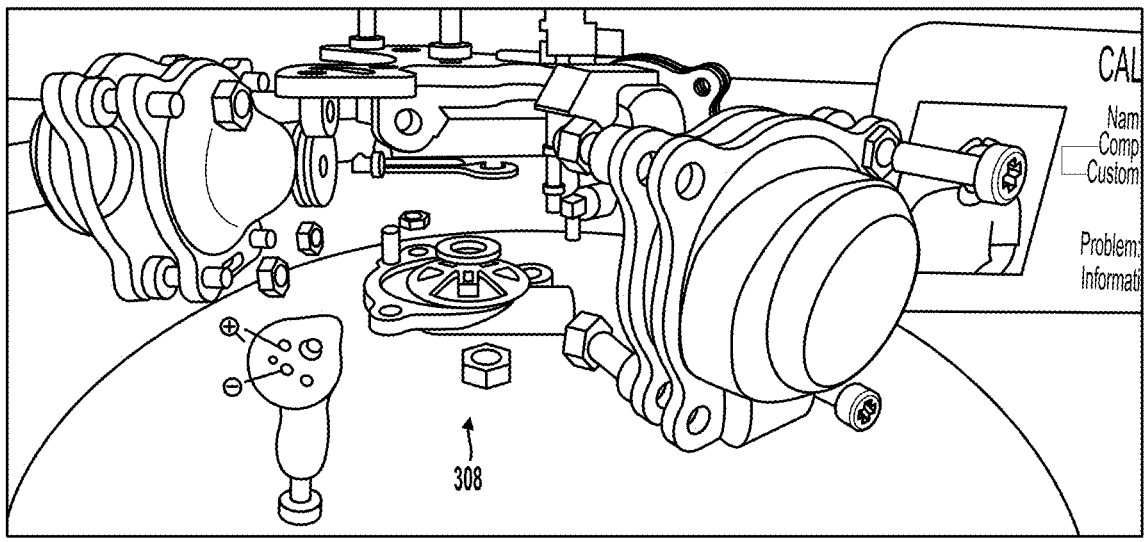
FIG. 3D is a representation of an example virtual environment showing manipulation of the example object.
Figure 3E:
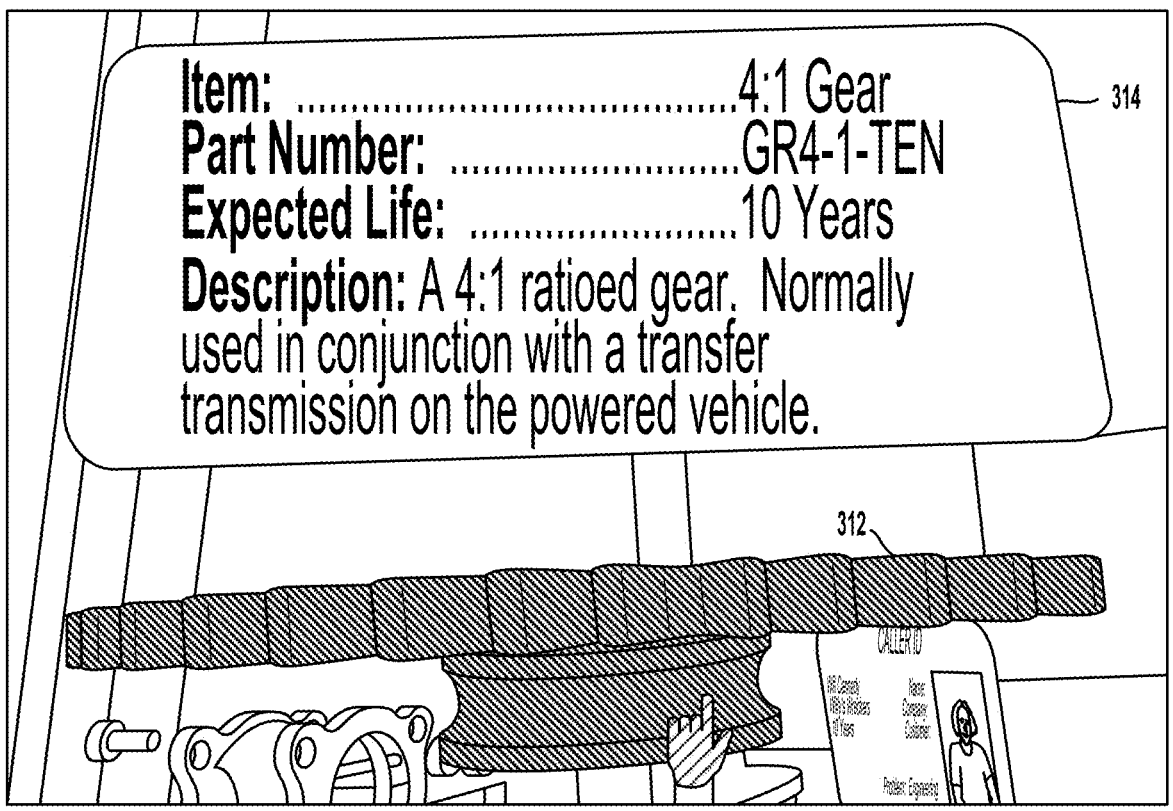
FIG. 3E is a representation of an example virtual environment showing information associated with an example object.

As shown in FIG. 3D, the representation of the object 308 (e.g., the virtual feature) is selectable, manipulatable, navigable, alterable, and/or the like. The environment allows the object 308 to be transitioned from a regular view to an exploded view, in which the parts of the object 308 are exposed. As shown in FIG. 3E, one or more parts of the object 308 (e.g., the virtual feature) are selectable (e.g., shading or coloring may indicate that the part is selectable). In this example, selection of the one or more parts 312 displays an information element 314 comprising information associated with the part 312, such as item name, part number, expected life of the part, description of the part, and/or the like.

Figure 3F:
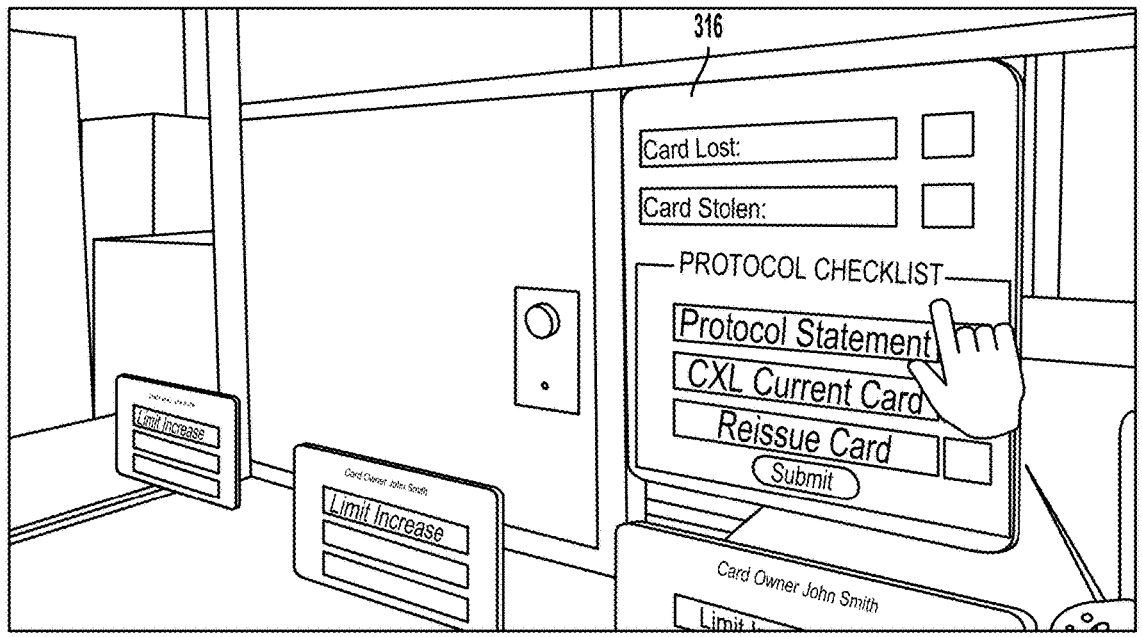
FIG. 3F is a representation of an example virtual environment showing example virtual features of a process flow.
Figure 3G:
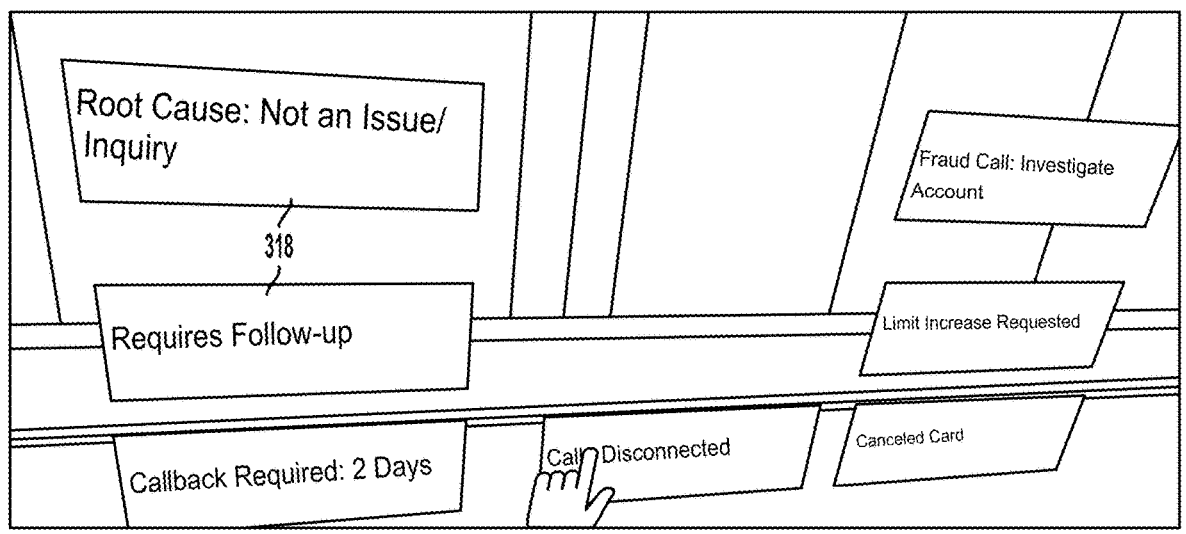
FIG. 3G is a representation of an example virtual environment showing example virtual features of a process flow.

As shown in FIGS. 3F-3G, the virtual features may comprise a variety of different information elements. FIG. 3F shows an information element 316 with selectable interface elements, such as a checklist. The virtual feature is based on a process flow. The virtual feature is a representation of a process flow from an application, such as a web application. The virtual feature is rendered as a two or three-dimensional pane in a three-dimensional virtual environment. The process flow may instruct a user operating in the virtual environment on procedures associated with handling a call. FIG. 3G shows additional views of a process flow. As the user progresses through the process flow, new and/or additional information elements 318 (e.g., virtual features) may be output in the virtual environment. The user may virtually select, tap, and/or the like the additional information elements 318 to indicate an outcome of the audio communication link.

Figure 4:
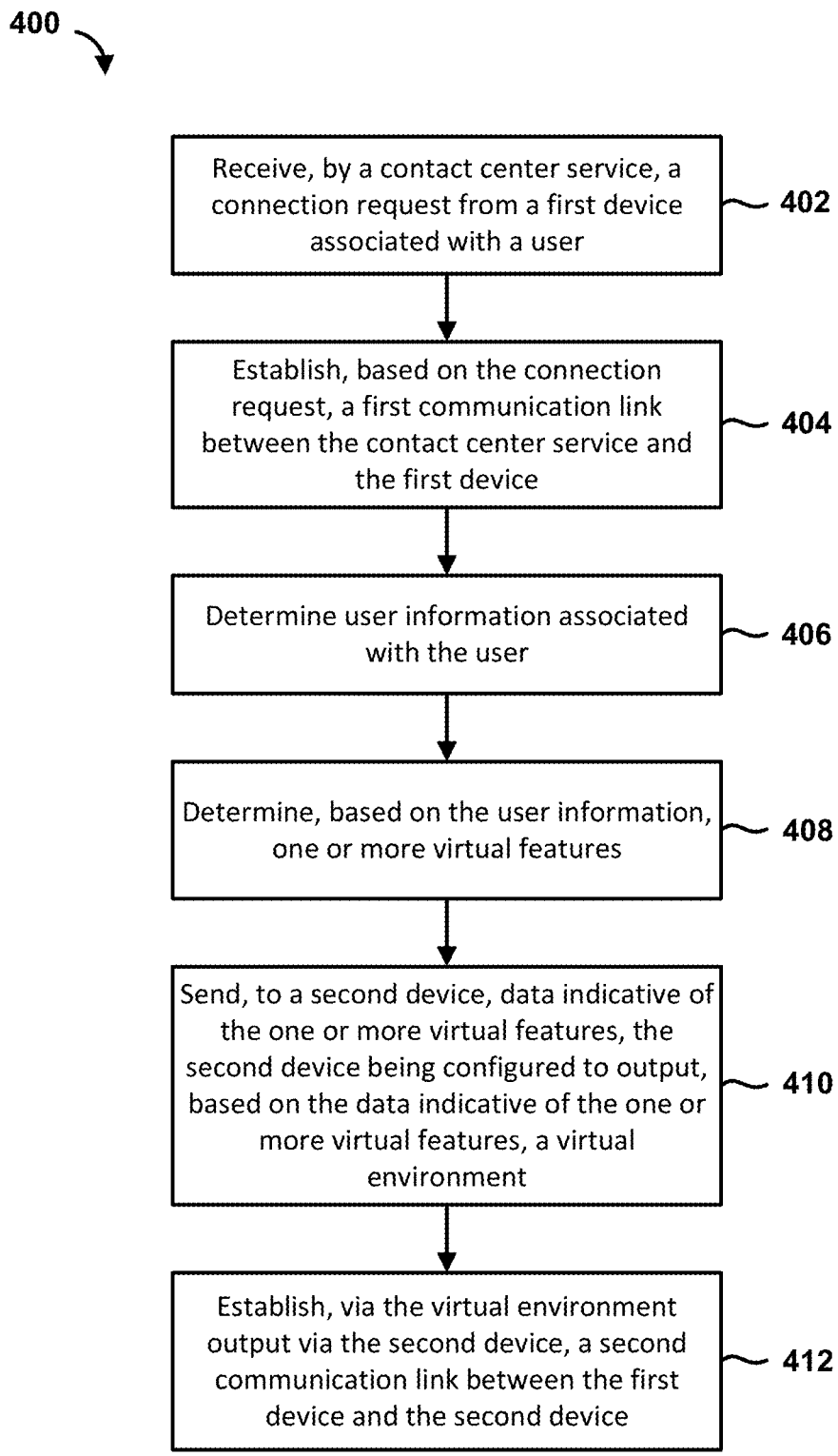
FIG. 4 is a flowchart showing an example process related to a communication service.

FIG. 4 is a flowchart showing an example process 400 for use in connection with the disclosed methods. The process 400 may comprise a computer implemented process for providing a communication service to a virtual environment. A system and/or computing environment, such as the system 100 of FIG. 1, the system 200 of FIG. 2, the computing environment of FIG. 6, and/or the computing system of FIG. 7 may be configured to perform the process 400.

Operation 402 depicts receiving a connection request. The connection request may be associated with a user. The connection request may be received from a first device. The user may be associated with the first device. The connection request may comprise an audio call request, chat request, video call request, a combination thereof, and/or any other type of communication request. The connection request may be received by a contact center service (e.g., a call center service, or one or more computing devices, computing nodes). The connection request may comprise a message, such as a session initiation protocol request (e.g., SIP invite request). In embodiments, the connection request is received via a telephone network. Operation 404 depicts establishing, based on the connection request, a first communication link (e.g., or first communication session, first link of a communication session) between the contact center service and the first device. The contact center service may respond to the message by sending one or more messages that assist in establishing the first communication link. The first communication link may comprise an audio communication link, a video communication link, a chat communication link, a text communication link, a multimedia communication link, a web based communication link, an application based communication link, a telephone based communication link, or a combination thereof.

Operation 406 depicts determining user information associated with the user (e.g., and first device). In embodiments, the user information comprises context information received via input from the user of the first device, account information associated with the user, or a combination thereof. The context information may indicate a context (e.g., purposes) for the connection request. The context information may comprise one or more of user input received via the first device or data indicating an interaction with an automated voice menu of the first communication link. If the first communication link is established, the call center service may connect the first device with an automated voice menu. The user of the first device may be asked one or more questions (e.g., to determine the purpose of the call). Answers are received in the form of spoken answer (e.g., which may be translated to text for processing), a tone cause by pressing digit on the phone (e.g., dual tone multi frequency tone), and/or the like. The answers from the first device may be processed to determine the context information.

In embodiments, the user information comprises account information associated with the user (e.g., and the first device). The account information may comprise one or more of a user name, an order history, call history, product information of a product in the order history, or business information. A caller identifier (e.g., phone number, or other identifier) associated with the first device may be determined. The caller identifier may be used to search a data store of users. User information in the data store associated with the caller identifier may be determined. The user associated with the first device may also provide other identifying information, such as an account number, company name, policy number, user name, and/or the like.

Operation 408 depicts determining, based on the user information, one or more virtual features. The one or more virtual features may comprise one or more of a graphical representation of the user information, an object model determined to be relevant to a user of the first device, or a graphical representation of a communication flow (e.g., call flow) for a user of the second device. In embodiments, determining the one or more virtual features may comprise determining, based on user input from the user (e.g., input via the first device), data indicative of a product. The one or more virtual features may be determined based on the data indicative of the product. The one or more virtual features may comprise an object model comprising a plurality of parts.

Operation 410 depicts sending, to a second device, data indicative of the one or more virtual features. The second device may be configured to output, based on the data indicative of the one or more virtual features, a virtual environment. An application executed on the second device may be configured to render the one or more virtual features based on the data indicative of the one or more virtual features. The second device may be configured to allow an additional user to one or more of navigate, manipulate, or interact with at least one of the one or more virtual features via the virtual environment.

Operation 412 depicts establishing, via the virtual environment output via the second device, a second communication link (e.g., or second audio communication session, or second link of the communication session) between the first device and the second device. The second communication link may comprise an audio communication link, a video communication link, a chat communication link, a text communication link, a multimedia communication link, a web based communication link, an application based communication link, a telephone based communication link, or a combination thereof. The first device may comprise a telephone device. The second device may comprise a virtual reality device. The first device may access the second communication link via a telephone network. The second device may access the second communication link via a web page configured to cause output of the virtual environment. In an embodiment, the virtual environment may comprise a virtual contact center (e.g., virtual call center). The virtual contact center may be configured to allow the additional user of the second device to access one or more call center application features. At least a portion of the account information may be displayed in the virtual environment. The virtual environment may be configured to allow the additional user of the second device to select a first part of the plurality of parts (e.g., of the object) to access information associated with the first part.

Figure 5:
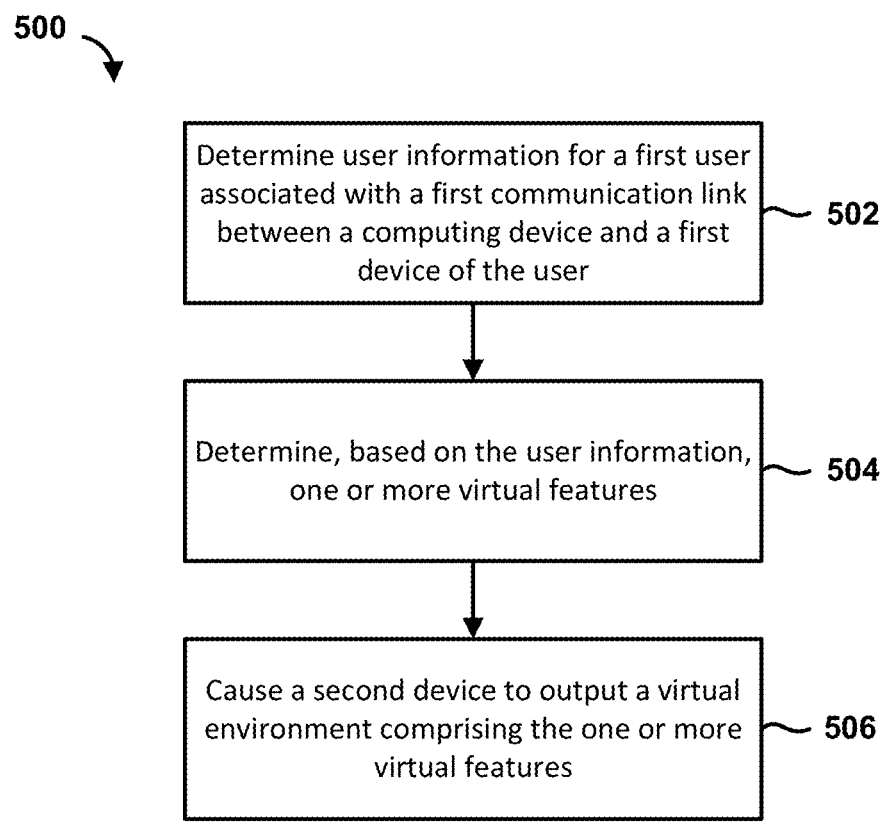
FIG. 5 is a flowchart showing an example process related to a communication service.

FIG. 5 is a flowchart showing an example process 500 for use in connection with the disclosed methods. The process 500 may comprise a computer implemented process for providing a communication service to a virtual environment. A system and/or computing environment, such as the system 100 of FIG. 1, the system 200 of FIG. 2, the computing environment of FIG. 6, and/or the computing system of FIG. 7 may be configured to perform the process 500.

Operation 502 depicts determining user information associated with a first communication link (e.g., or first communication session, or first link of a communication session) between a computing device and a first device. The first communication link may comprise an audio communication link, a video communication link, a chat communication link, a text communication link, a multimedia communication link, a web based communication link, an application based communication link, a telephone based communication link, or a combination thereof. The user information may comprise context information. The context information may be associated with a user, the first device, and/or the like. The context information may be received from the first device via the first communication link. The user information may comprise account information associated with the user, the first device, and/or the like. The context information may comprise one or more of user input via the first device or data indicating an interaction with an automated voice menu of the audio communication link. The context information may be received by the computing device. The account information may comprise one or more of a user name, an order history, call history, product information of a product in the order history, or business information.

Operation 504 depicts determining, based on the user information, one or more virtual features. The one or more virtual features may comprise one or more of a graphical representation of the user information, an object model determined to be relevant to a user of the first device, or a graphical representation of a call flow for a user of the second device. In embodiments, determining the one or more virtual features may comprise determining, based on user input from the user, data indicative of a product. The one or more virtual features may be determined based on the data indicative of the product. The one or more virtual features may comprise an object model comprising a plurality of parts.

Operation 506 depicts causing a second device to output a virtual environment comprising the one or more virtual features. The second device may be caused to output a virtual environment by one or more of sending data to an application of the second device or sending a uniform resource locator for accessing the virtual environment via a web page. The second device may be configured to allow a user to one or more of navigate, manipulate, or interact with at least one of the one or more virtual features via the virtual environment. The second device may comprise an application that uses a rendering engine to interpret and/or render three-dimensional data, such as models, environment data, and/or the like.

A second communication link (e.g., or a second communication session, or second link of the communication session) may be established, via the virtual environment, between the first device and the second device. The second communication link may comprise an audio communication link, a video communication link, a chat communication link, a text communication link, a multimedia communication link, a web based communication link, an application based communication link, a telephone based communication link, or a combination thereof. The first device may comprise a telephone device. In an embodiment, the second device comprises a virtual reality device. The first device may access the second communication link via a telephone network (e.g., or other network). The second device may access the second communication link via a web page configured to cause output of the virtual environment.

The virtual environment may comprise a virtual contact center (e.g., virtual call center). The virtual contact center may be configured to allow an additional user of the second device to access one or more contact center application features. At least a portion of the account information may be displayed in the virtual environment. The virtual environment may be configured to allow the additional user of the second device to select a first part of the plurality of parts (e.g., of the object) to access information associated with the first part.

Figure 6:
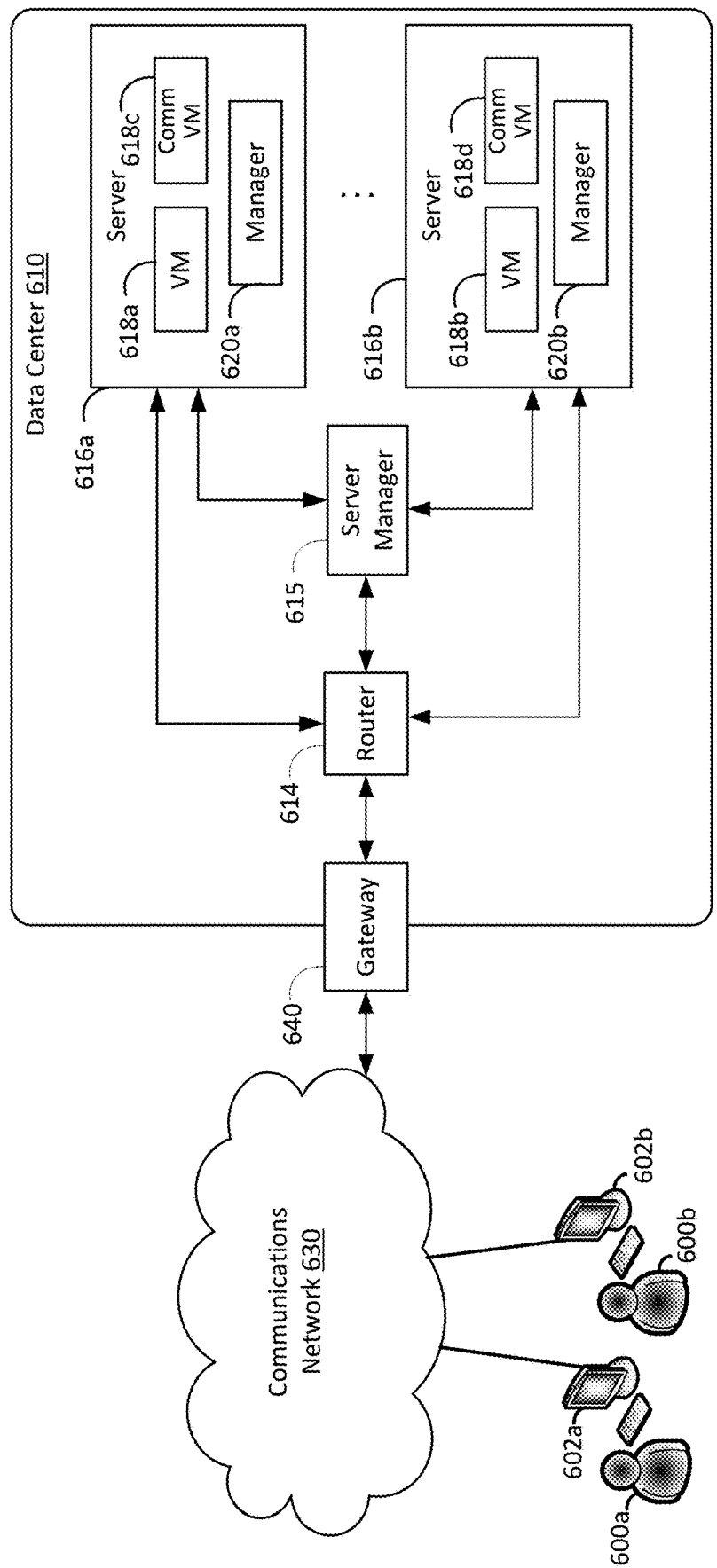
FIG. 6 is a diagram illustrating an example computing system that may be used in some embodiments.

FIG. 6 illustrates an example computing environment in which the embodiments described herein may be implemented. The example computing environment of FIG. 6 may be configured to implement one or more of the services platform, the communication service 102, the content service 104, the virtual reality service 106, the storage service 108, or a combination thereof of FIG. 1. The example computing environment of FIG. 6 may be configured to implement the contact center service 204, the request service 206, the virtual reality service 208, the data service 210, the authentication service 212, the content service 214, or a combination thereof of FIG. 2. The example computing environment of FIG. 6 may be configured to implement any of the methods described herein, such as any methods (e.g., or any operations) associated with FIGS. 1, 2, 3A-F, 4, and 5.

FIG. 6 is a diagram schematically illustrating an example of a data center 610 that can provide computing resources to users 600a and 600b (which may be referred herein singularly as user 600 or in the plural as users 600) via user computers 602a and 602b (which may be referred to herein singularly as computer 602 or in the plural as computers 602) via a communications network 630. Data center 610 may be configured to provide computing resources for executing applications on a permanent or an as-needed basis. The computing resources provided by data center 610 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 610 may include servers 616a-b (which may be referred herein singularly as server 616 or in the plural as servers 616) that provide computing resources. These resources may be available as bare metal resources, or as virtual machine instances 618a-d and (which may be referred herein singularly as virtual machine instance 618 or in the plural as virtual machine instances 618). Virtual machine instances 618c and 618d can be communication service virtual machine. The communication service virtual machine instances 618c and 618d may be configured to perform all or any portion of the communication services (e.g., contact center services, virtual environment services, determining virtual features, facilitating communication sessions, content services for accessing virtual environments) in accordance with the present disclosure and described in detail herein. As should be appreciated, while the particular example illustrated in FIG. 6 includes one communication service virtual machine in each server, this is merely an example. A server may include more than one communication service virtual machine or may not include any communication service virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 6, communications network 630 may, for example, be a publicly accessible network of linked networks and possibly operated by various distinct parties, such as the Internet. In other embodiments, communications network 630 may be a private network, such as, a corporate or university network that is wholly or partially inaccessible to non-privileged users. In still other embodiments, communications network 630 may include one or more private networks with access to and/or from the Internet.

Communication network 630 may provide access to computers 602. User computers 602 may be computers utilized by users 600 or other customers of data center 610. For instance, user computer 602a or 602b may be a server, a desktop or laptop personal computer, a tablet computer, a wireless telephone, a personal digital assistant (PDA), an e-book reader, a game console, a set-top box or any other computing device capable of accessing data center 610. User computer 602a or 602b may connect directly to the Internet (e.g., via a cable modem or a Digital Subscriber Line (DSL)). Although only two user computers 602a and 602b are depicted, it should be appreciated that there may be multiple user computers.

User computers 602 may also be utilized to configure aspects of the computing resources provided by data center 610. In this regard, data center 610 might provide a gateway or web interface through which aspects of its operation may be configured through the use of a web browser application program executing on user computer 602. Alternately, a stand-alone application program executing on user computer 602 might access an application programming interface (API) exposed by data center 610 for performing the configuration operations. Other mechanisms for configuring the operation of various web services available at data center 610 might also be utilized.

Servers 616 shown in FIG. 6 may be standard servers configured appropriately for providing the computing resources described above and may provide computing resources for executing one or more web services and/or applications. In one embodiment, the computing resources may be virtual machine instances 618. In the example of virtual machine instances, each of the servers 616 may be configured to execute an instance manager 620a or 620b (which may be referred herein singularly as instance manager 620 or in the plural as instance managers 620) capable of executing the virtual machine instances 618. The instance managers 620 may be a virtual machine monitor (VMM) or another type of program configured to enable the execution of virtual machine instances 618 on server 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 610 shown in FIG. 6, a router 614 may be utilized to interconnect the servers 616a and 616b. Router 614 may also be connected to gateway 640, which is connected to communications network 630. Router 614 may be connected to one or more load balancers, and alone or in combination may manage communications within networks in data center 610, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 610 shown in FIG. 6, a server manager 615 is also employed to at least in part direct various communications to, from and/or between servers 616a and 616b. While FIG. 6 depicts router 614 positioned between gateway 640 and server manager 615, this is merely an exemplary configuration. In some cases, for example, server manager 615 may be positioned between gateway 640 and router 614. Server manager 615 may, in some cases, examine portions of incoming communications from user computers 602 to determine one or more appropriate servers 616 to receive and/or process the incoming communications. Server manager 615 may determine appropriate servers to receive and/or process the incoming communications based on factors such as an identity, location or other attributes associated with user computers 602, a nature of a task with which the communications are associated, a priority of a task with which the communications are associated, a duration of a task with which the communications are associated, a size and/or estimated resource usage of a task with which the communications are associated and many other factors. Server manager 615 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 610 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
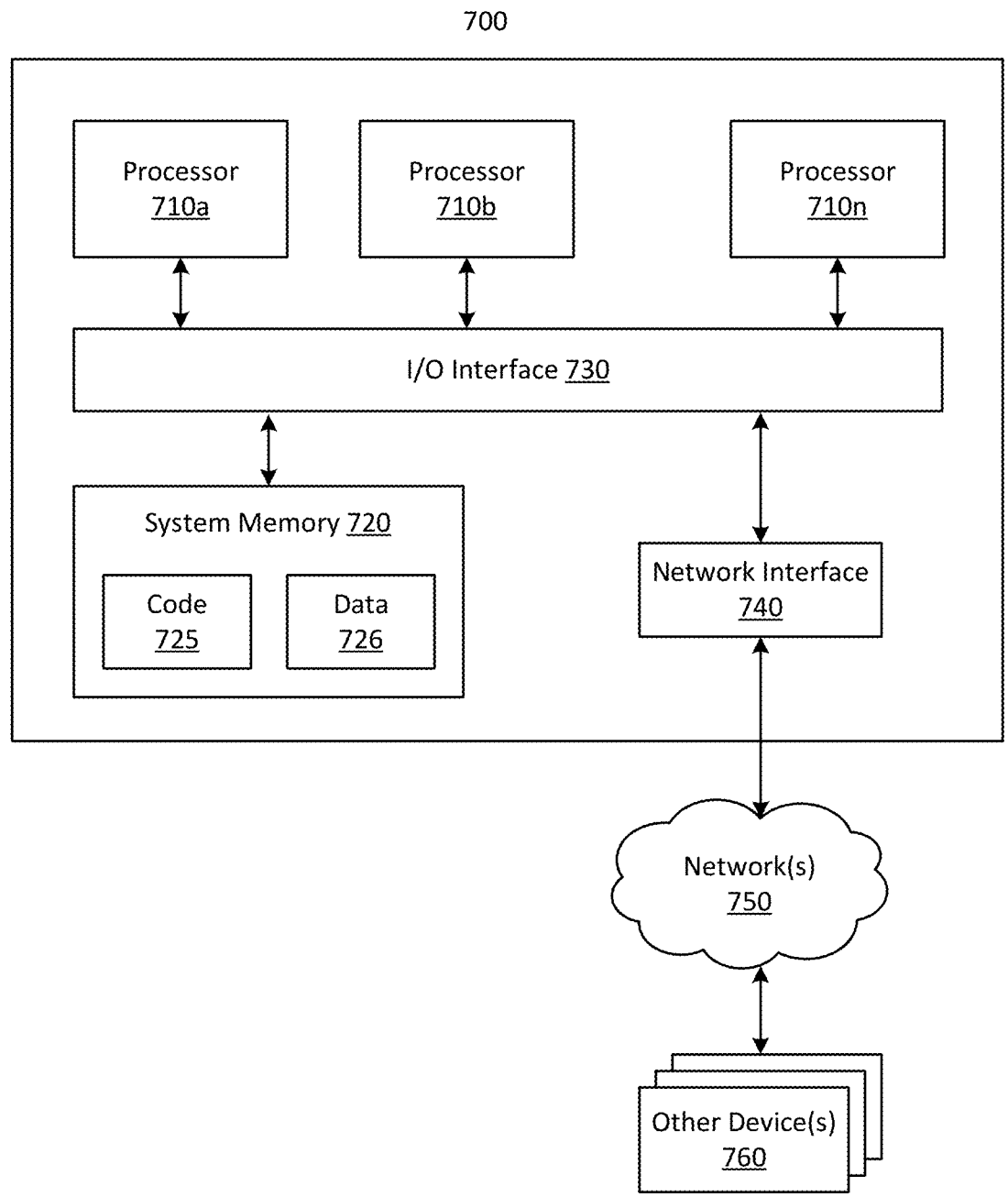
FIG. 7 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. The example computer system of FIG. 7 may be configured to implement one or more of the services platform, the communication service 102, the content service 104, the virtual reality service 106, the storage service 108, or a combination thereof of FIG. 1. The example computer system of FIG. 7 may be configured to implement the contact center service 204, the request service 206, the virtual reality service 208, the data service 210, the authentication service 212, the content service 214, or a combination thereof of FIG. 2. The example computer system of FIG. 7 may be configured to implement any of the methods described herein, such as any methods (e.g., or any operations) associated with FIGS. 1, 2, 3A-F, 4, and 5.

In the illustrated embodiment, computing device 700 includes one or more processors 710*a*, 710*b* and/or 710*n* (which may be referred herein singularly as "a processor 710" or in the plural as "the processors 710") coupled to a system memory 720 via an input/output (I/O) interface 730. Computing device 710 further includes a network interface 740 coupled to I/O interface 730.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC or MIPS ISAs or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 730. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 700 as system memory 720 or another type of memory. Further, a computer-accessible medium may include transmission media or signals such as electrical, electromagnetic or digital signals conveyed via a communication medium such as a network and/or a wireless link, such as those that may be implemented via network interface 740. Portions or all of multiple computing devices such as those illustrated in FIG. 7 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments.

Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer implemented method, the method comprising:
    receiving, by a contact center service, a connection request from a first device associated with a user;
    establishing, based on the connection request, a first communication link between the contact center service and the first device;
    determining, based on the first communication link, user information associated with the user, wherein the user information comprises one or more of context information or account information;
    determining, based on the user information, one or more virtual features;
    generating, based on determining the user information via the first communication link, application data associated with a web page, wherein the application data causes generation of the web page and comprises data indicative of the one or more virtual features, an audio component configured to establish audio communication between the first device and the web page, and a rendering component configured to render the application data to display a virtual environment comprising the one or more virtual features;
    sending, to a second device, the application data to cause the second device to one or more of update or output the web page to facilitate a communication session between the first device and the second device; and
    establishing, via the virtual environment output via the second device and based on sending the application data, a second communication link between the first device and the second device for the communication session, wherein the first device accesses the second communication link via a telephone network and the second device accesses the second communication link via the web page.

2. The method of claim 1, wherein the first communication link and the second communication link comprise one or more audio communication links, and wherein the first device comprises a telephone device and the second device comprises a virtual reality device.

3. The method of claim 1, wherein the one or more virtual features comprise one or more of a graphical representation of the user information, an object model determined to be relevant to the user, or a graphical representation of a communication flow for an additional user of the second device.

4. The method of claim 1, wherein the context information comprises one or more of user input received via the first device or data indicating an interaction with an automated voice menu of the first communication link.

5. A system comprising one or more memories having instructions thereon that, upon execution by one or more processors of the system, at least cause the system to:
    determine user information for a user associated with a first communication link between a computing device and a first device of the user, wherein the user information comprises context information received by the computing device via the first communication link;
    generate, based on processing the user information by the computing device, application data associated with a web page, wherein the application data causes generation of the web page and comprises data indicative of one or more virtual features, an audio component configured to establish audio communication between the first device and the web page, and a rendering component configured to render the application data to display a virtual environment comprising the one or more virtual features; and
    cause, based on the application data, a second device to output, via the web page, the virtual environment comprising the one or more virtual features, wherein a second communication link is established, via the virtual environment, between the first device and the second device, wherein the first device accesses the second communication link via a telephone network and the second device accesses the second communication link via the web page.

6. The system of claim 5, wherein the one or more virtual features comprise one or more of a graphical representation of the user information, an object model determined to be relevant to the user, or a graphical representation of a communication flow for an additional user of the second device.

7. The system of claim 5, wherein the context information comprises one or more of user input via the first device or data indicating an interaction with an automated voice menu of the first communication link.

8. The system of claim 5, wherein the system is configured to determine, based on processing the user information by the computing device, the one or more virtual features by:
    determining, based on user input from the user, data indicative of a product; and
    determining, based on the data indicative of the product, the one or more virtual features.

9. The system of claim 5, wherein one or more virtual features comprise an object model comprising a plurality of parts, and wherein the virtual environment is configured to allow an additional user of the second device to select a first part of the plurality of parts to access information associated with the first part.

10. The system of claim 5, wherein the user information comprises account information comprising one or more of a user name, an order history, call history, product information of a product in the order history, or business information, and wherein at least a portion of the account information is displayed in the virtual environment.

11. The system of claim 5, wherein the virtual environment comprises a virtual contact center configured to allow an additional user of the second device to access contact center application features.

12. A non-transitory computer-readable storage medium having stored thereon computer-readable instructions, the computer-readable instructions comprising instructions that, upon execution on one or more computing devices, at least cause:
- determining user information for a user associated with a first communication link between a computing device and a first device, wherein the user information comprises context information received by the computing device via the first communication link;
- generating, based on processing the user information by the computing device, application data associated with a web page, wherein the application data causes generation of the web page and comprises data indicative of one or more virtual features, an audio component configured to establish audio communication between the first device and the web page, and a rendering component configured to render the application data to display a virtual environment comprising the one or more virtual features; and
- causing, based on the application data, a second device to output, via the web page, the virtual environment comprising the one or more virtual features, wherein a second communication link is established, via the virtual environment, between the first device and the second device, wherein the first device accesses the second communication link via a telephone network and the second device accesses the second communication link via the web page.

13. The computer-readable storage medium of claim 12, wherein the first device comprises a telephone device and the second device comprises a virtual reality device.

14. The computer-readable storage medium of claim 12, wherein the one or more virtual features comprise one or more of a graphical representation of the user information, an object model determined to be relevant to the user, or a graphical representation of a communication flow for an additional user of the second device.

15. The computer-readable storage medium of claim 12, wherein the context information comprises one or more of user input from the user or data indicating an interaction with an automated voice menu of the first communication link.

16. The system of claim 5, wherein processing the user information by a computing device comprises processing one or more rules associating user information with corresponding virtual features.

17. The system of claim 5, wherein processing the user information by a computing device comprises determining an account associated with a user, analyzing the account for information associated with the account, and generating a virtual feature representing the information.

18. The method of claim 1, wherein the web page is configured to trigger a rendering event of the rendering component in response to detecting a communication event associated with the audio component.

\* \* \* \* \*